No. 846,624. PATENTED MAR. 12, 1907.
W. L. SAUNDERS.
DEVICE TO DISCLOSE OPENING OF THE SHUNT CIRCUITS OF ELECTRIC METERS.
APPLICATION FILED JUNE 27, 1905.
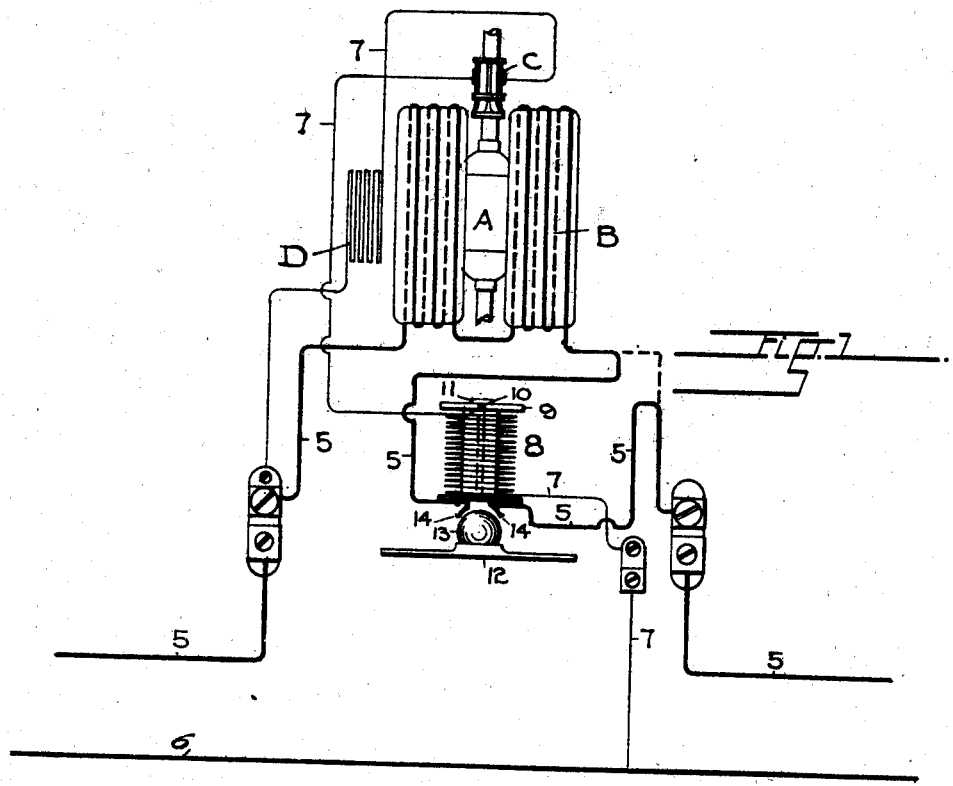
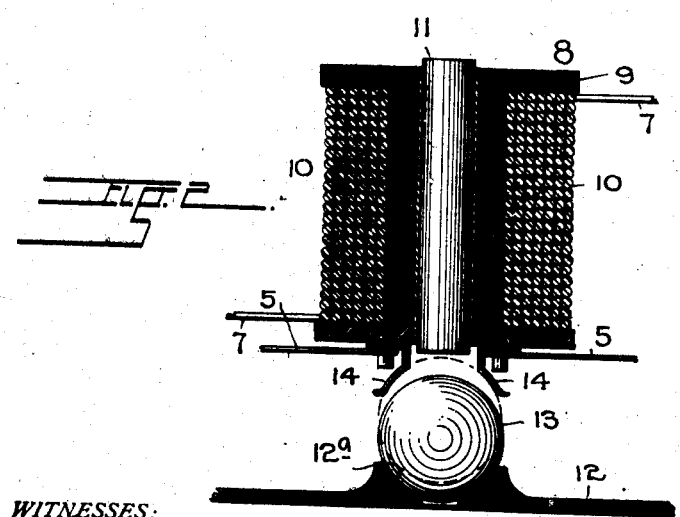
WITNESSES:
INVENTOR.
WILLIAM L. SAUNDERS
BY
ATTORNEY.

UNITED STATES PATENT OFFICE.

WILLIAM L. SAUNDERS, OF DENVER, COLORADO, ASSIGNOR OF TWO-THIRDS TO DANIEL K. HICKEY, OF DENVER, COLORADO.

DEVICE TO DISCLOSE OPENING OF THE SHUNT-CIRCUITS OF ELECTRIC METERS.

No. 846,624.    Specification of Letters Patent.    Patented March 12, 1907.

Application filed June 27, 1905. Serial No. 267,278.

*To all whom it may concern:*

Be it known that I, WILLIAM L. SAUNDERS, a citizen of the United States of America, residing at Denver, in the county of Denver and State of Colorado, have invented certain new and useful Improvements in Devices to Disclose Opening of the Shunt-Circuit of Electric Meters, of which the following is a specification.

My invention relates to devices purported to disclose the opening of the shunt-circuit in electric meters, its object being to provide a simple contrivance, which being placed in the electric circuit will by instantaneously signaling the fact of a break having been made in the shunt-circuit lead to the detection of any attempt at tampering made by unauthorized or maliciously-inclined persons. I attain this object by causing the flow of electricity to be interrupted through simultaneous opening of the main circuit when the shunt-circuit is broken, which if the circuit is used for illuminating purposes will extinguish all the lights on the circuit or in case it is used for transmission of power will render the various pieces of machinery connected therewith inoperative.

In the drawings, in the several views of which like parts have been similarly designated, Figure 1 represents a diagrammatical view of the electric circuit, showing its connection with the main parts of the meter mechanism and of my attachment; and Fig. 2, an enlarged vertical section through my device.

In Fig. 1 the main circuit has been indicated by heavy lines, while the shunt-circuit is shown in lighter lines.

To render the operation of my device more intelligible, I have represented the main parts of the meter mechanism diagrammatically, A being the armature, and B the field of the driving mechanism, C the commutator, and D the resistance-coil.

5 and 6 designate the wires of the main circuit, in the former of which the meter is located, and 7 the shunt-wire leading from wire 6 through the commutator and the resistance-coil to the outgoing wire 5.

It should be understood that the meter has been illustrated in the drawings in a merely conventional manner and that my device may be employed with equal results on all instruments designed to measure the quantity of electricity supplied to consumers, provided a shunt-circuit is employed.

My attachment consists of an electromagnetic switch 8, interposed in the shunt-circuit and comprising the spool 9, coil 10, soft-iron core 11, insulated base 12, armature 13, and contact-springs 14 and 14.

The device may be secured inside the meter or in a separate casing, according to the size and style of meter on which it is to be employed.

Spool 9 normally extends in a vertical position, the armature-base being secured below it. Coil 10 is preferably composed of the shunt-wire, which to this end is wound around the spool.

The armature 13 is preferably globular in form and rests, when not attracted, in a correspondingly-shaped recess 12ª in base 12.

Contact-springs 14 being oppositely secured to the lower flange of the insulated spool are shaped and arranged to be simultaneously engaged by the spherical armature 13 when the latter is in its normal elevated position, being held by the magnetism induced into the core from the electric current passing through coil 10. Wire 5 at this point has been broken and its terminals respectively secured to each of the two contact-springs 14.

Having thus described the mechanism of my device, its operation is as follows: Core 11 being normally magnetized by the effect of the electric current flowing through coil 10 attracts the globular armature 13, which, engaging the two contact-springs 14, closes the main circuit. The moment, however, that either maliciously or accidentally a break is made in the shunt-circuit the core loses its magnetization, and ball 13, falling into its cup-shaped seat in base 12, opens the main circuit by disengaging springs 14. The electric current being thus interrupted naturally results in extinguishing the lights or stopping the machinery in the circuit, either of which occurrences will instantaneously give notice of the breaking of the shunt-circuit.

Having thus described my invention, what I claim is—

1. The combination with an electric meter of an electromagnetic switch the coil of which is placed in the shunt-circuit, and having an armature adapted to engage the terminals of a broken wire of the main circuit when in its normal position.

2. The combination with an electric meter of an electromagnet placed in the shunt-circuit, suitably-located contacts respectively engaging the terminals of a broken wire of the main circuit, an armature adapted to simultaneously engage said contacts when in its normal position, and a seat adapted to receive said armature when released from the magnet.

3. The combination with an electric meter of an electromagnet located in the shunt-circuit, contact-points respectively engaging the terminals of a broken wire of the main circuit secured thereto, an armature adapted to simultaneously engage said contacts, and an insulated seat located below said magnet and adapted to receive and support the armature when the core loses its magnetization.

In testimony whereof I have affixed my signature in presence of two witnesses.

WILLIAM L. SAUNDERS.

Witnesses:
G. J. ROLLANDET,
K. M. STUMP.